July 22, 1941.  H. HELLBERG ET AL  2,249,954
GAUGE FOR MEASURING AND CHECKING DIMENSIONS AND FORMS
Filed Aug. 2, 1940  2 Sheets-Sheet 1
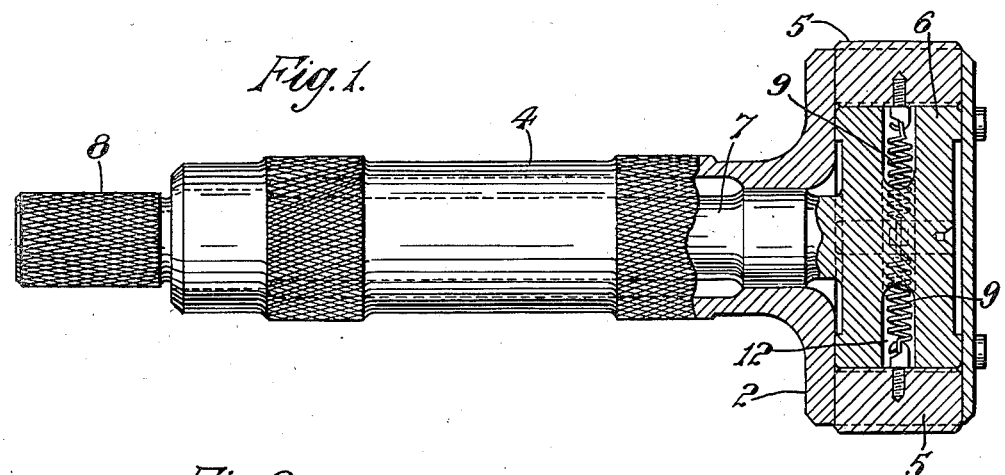
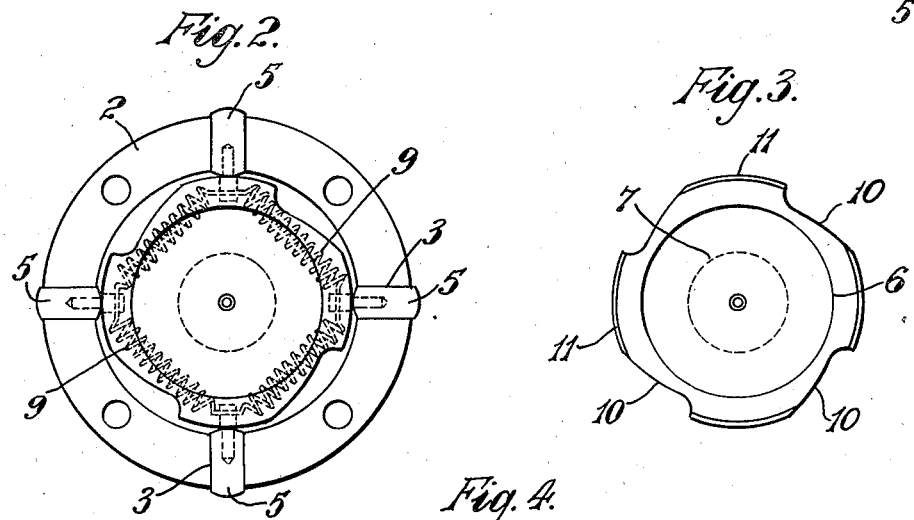
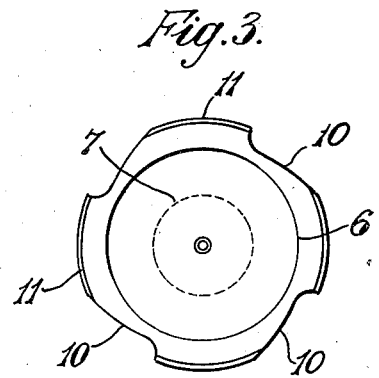
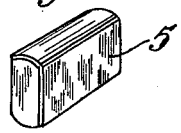
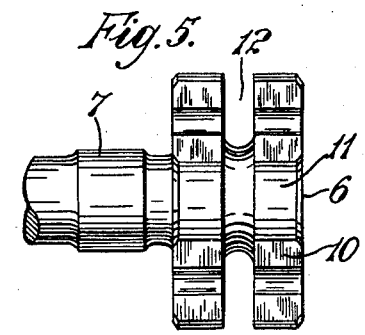
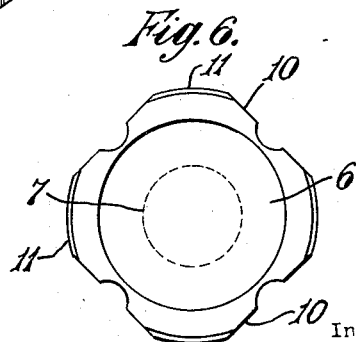
Inventors:
Helge Hellberg,
Harold J. Haycock,
Cyril L. Hellberg
by Babcock & Babcock
Attorneys Inventors:
Helge Hellberg,
Harold J. Haycock,
Cyril L. Hellberg by Babcock & Babcock
Attorneys Patented July 22, 1941

2,249,954

UNITED STATES PATENT OFFICE 2,249,954

GAUGE FOR MEASURING AND CHECKING DIMENSIONS AND FORMS

Helge Hellberg and Harold James Haycock, Coventry, and Cyril Loose Hellberg, Lichfield, England Application August 2, 1940, Serial No. 349,812
In Great Britain August 28, 1939

10 Claims. (Cl. 33—178)

This invention relates to gauges of the retractable type in which a plurality of gauging elements are arranged to have movement radially of a common axis either by means of a rotatable cam or by means of an axially movable member.

In gauges of this type as previously proposed the formation of the cam or of the axially movable member is such that the position of the gauging elements varies within pre-determined high and low limits.

Gauges constructed according to this invention are distinguished from previous gauge constructions of the general type above referred to in that the formation of the cam, or of the axially movable member, as the case may be, is such that the gauging elements are adapted to be moved thereby into one definite pre-determined gauging position, which may represent either the 'go' or the 'not go' limit for a given work-piece, and are rigidly supported in that position.

Where a rotatable cam is employed the profile thereof for each gauging member has two parts, one being a cam portion which is effective for bringing the gauging members into the predetermined gauging position whilst the other is a concentric portion for rigidly supporting the said elements in the gauging position.

Similarly, where an axially movable member is employed it is formed with conical and parallel portions the former operating to move the gauging elements into their predetermined gauging position and the parallel portion to support them rigidly in that position.

In the accompanying drawings,

Figure 1 is a part sectional view of a male gauge embodying one form of the present invention.

Figure 2 is an end view of the same with the cover plate removed.

Figure 3 shows one form of rotatable cam.

Figure 4 is a detail view of one form of gauging element.

Figures 5 and 6 are end and face views respectively of another form of rotatable cam.

Figure 7:
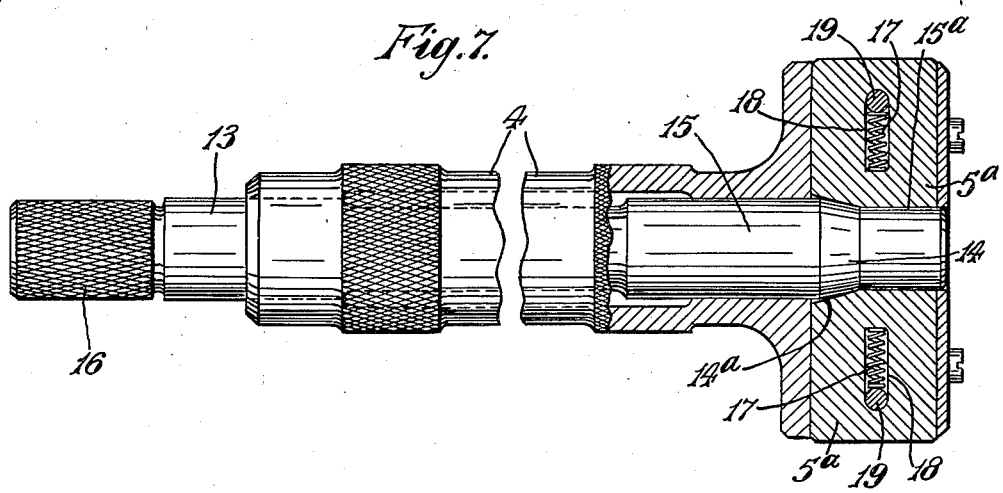
Figure 7 is a view similar to Figure 1 of a male gauge embodying another form of the invention.

The improved gauge herein described is not an adjustable gauge in the ordinary acceptation of the term, the gauging elements having definite operative positions.

Referring to sheet one of the drawings which shows the application of the invention in one of its forms to a male gauge, 2 represents the hollow cylindrical gauge body having a number of radial slots 3 and a tubular extension 4. 5 represents the gauging elements which are slidably arranged in the said slots. 6 represents a cam which is rotatably mounted in the said hollow gauge body 2 and is provided with a spindle 7 extending through the tubular extension 4. The spindle is provided at its outer end with a knurled handle 8 for rotating the cam.

Normally the gauging elements are retracted in the gauge body by means of tension springs 9 to a diameter less than that of the nominal diameter of the gauge. The gauge can then be readily engaged with the work-piece to be gauged without injury to either part or loss of time. The cam is then operated in a direction to move the gauging elements to the pre-determined or nominal diameter.

The cam which has a similar profile 10 for each gauging element may be of the uni-directional type shown in Figures 2 and 3, or of the type shown in Figures 5 and 6 which can be rotated in either direction to move the gauging elements outwardly to the nominal gauge diameter against the action of the springs 9. As will be seen more clearly in Figure 1 the springs are accommodated in a deep annular groove 12 formed in the cam. In either case the profile of the cam for each gauging element has a concentric portion 11 for supporting the said elements rigidly in their gauging position. A complete revolution of the rotary cam will check the diameter of the work-piece as many times as there are gauging elements, all of the elements moving outwardly to the pre-determined diameter and back again under the influence of the cam profiles and of the springs respectively.

In the alternative arrangement shown in Figure 7 the cam is of the linear type and consists of a spindle 13 extending through the tubular extension 4 into the hollow body of the gauge where it is formed with taper and parallel portions 14 and 15 respectively.

The gauging members 5ᵃ are formed at their inner ends with a complementary inclined and parallel portions 14ᵃ, 15ᵃ respectively so that by moving the spindle axially in one direction by means of the handle 16 the co-action between the complementary inclined portions of the spindle and gauging elements moves the latter outwardly to their gauging position. In this case compression springs 17 arranged in slots 18 in the gauging elements and bearing against fixed pins 19 in the gauge body are employed to retract the said elements when the spindle is moved axially in the opposite direction. In their operative or gauging positions the said elements are rigidly supported by the parallel portion of the spindle.

Figure 8:
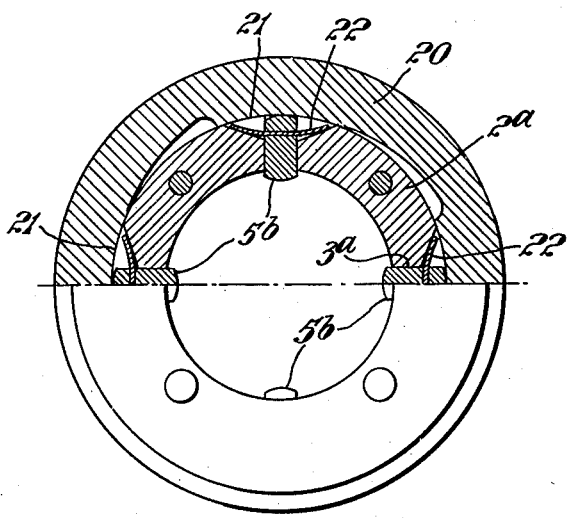
Figure 8 is a part sectional end view showing the application of one form of the invention to a female gauge.
Figure 9:
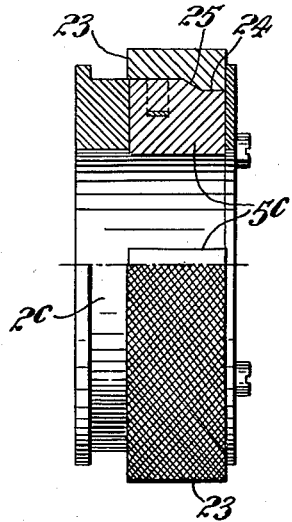
Figure 9 is a part-sectional side view of a female gauge embodying another form of the invention.

The application of the invention to female or ring gauges is shown in Figures 8 and 9. In the form shown in Figure 8 the gauging elements 5$^b$ are arranged to slide, as before, in radial slots 3$^a$ in a hollow gauge body 2$^a$ and are moved into their gauging position by means of a cam 20 rotatably mounted on the gauge body. As shown the cam is intended for rotation in a clockwise direction. The profile of the cam for each gauging element terminates in a concentric portion 21 which supports the element rigidly in its gauging position, as shown. The said elements are each retracted when the cam is in its inoperative position by blade springs 22 carried by the elements and bearings against a seating in the gauge body.

In the alternative form shown in Figure 9 the cam 23 is of the linear type consisting of a ring or sleeve slidable axially on the gauge body 2$^c$ and having a bore with parallel and inclined portions 24 and 25 respectively. In the position shown the gauging elements 5$^c$ which slide in radial slots in the gauge body are in their retracted or inoperative positions. If now the sleeve is moved axially toward the left-hand, the inclined portion thereof will co-act with the complementary inclined portion of the outer ends of the gauging elements and move the latter inwardly to their gauging positions where they are rigidly supported by the parallel portions 24 of the sleeve. When the sleeve is moved back again the gauging elements will be retracted by means of springs which may be of the kind shown in Figure 8 or of any other appropriate type.

One form of gauging element is shown separately in Figure 4. This is for gauging plain cylindrical work. The improved gauge may, however, be adapted for gauging screw threaded work or work having a certain contour in either of which cases the effective ends of the gauging elements will be appropriately formed. Instead of the form shown the gauging elements may consist of balls or rollers arranged to protrude through the slots in the body of the gauge and to be operated by the cam.

The improved gauges herein described can be used for checking the diameter and parallelism of plain cylindrical work and also for checking the diameter and thread form of screw-threaded work in which latter case the effective ends of the gauging elements will be formed with appropriate screw-thread forms.

The improved gauges have also the further advantage that they can be used for checking the concentricity of two or more diameters and, in the case of male gauges, for gauging the diameter concentricity and/or parallelism of holes in which the outer end is of less diameter than the inner end and, in the case of female gauges, of checking shouldered work.

If in the case of the male gauge the outer ends or heads of the gauging elements may be extended axially so as to be flush with the free end of the gauge body the gauge can be used for measuring the diameter of shouldered holes or the full depth of blind holes.

Another or additional use of the improved gauges is that of checking the internal or external axial contour of a work-piece, the effective ends of the gauging elements being formed to the required axial form. In this case the amount of the radial displacement of the elements would be slightly in excess of the maximum radial dimension of the contour in order to facilitate engagement of the gauge with the work.

In the case of male gauges any desired depth of hole or length of bore can be gauged by suitably extending the length of the extension of the body of the gauge and of the cam spindle.

The improved gauges can also be adapted for use in checking the dimensions of splined work, in which case the gauging elements check the width of the splines and the distance between them. In the case of the female gauge, the core diameter is checked by the gauging elements and the outside diameter by the body of the gauge, whilst in the case of the male gauge the core diameter is checked by the body of the gauge and the depth of the splines by the gauging elements.

We claim:

1. A gauge comprising a body formed with a radial slot; a gauging element slidably mounted for radial movement in said slot; manually operative means disposed concentrically with relation to said body and movable relative thereto and provided with a supporting portion, a release portion, and an intermediate cam portion; and retracting means acting on said element and causing radial movement of the latter toward said release portion when said release portion is brought into radial registry with said element; said supporting portion extending axially parallel to the axis of said body and being concentric with said axis and in contact with the adjacent end portion of said element in the normal gauging position of the latter; said release portion being radially more remote from the opposed face portion of said body than is said support portion and so formed as to permit said element to be moved radially by said retracting means into retracted non-gauging position when said release portion is moved into radial registry with said element; and said cam connecting said supporting and release portions and engaging the adjacent opposed end portion of said element and serving to force the latter radially in said slot when said manually operative means is moved in the proper direction to move said supporting portion into contact with said element when the latter has been forced radially to its extreme extended gauging position by said intermediate cam portion.

2. A gauge comprising a body formed with a plurality of radial slots; a plurality of gauging elements respectively mounted for radial movement in said respective slots; manually operative means disposed concentrically with relation to said body and movable relatively thereto and provided with a plurality of supporting portions corresponding in number to the number of gauging elements, a corresponding number of release portions, and a corresponding number of intermediate cam portions respectively connecting the respective supporting and release portions adjacent the end portions of the respective cam portions; and means causing radial movement of said elements respectively toward said respective release portions when the latter are respectively brought into radial and axial registry with the former; said supporting portions respectively extending axially parallel to the axis of said body and being concentric with said axis and respectively being in contact with the adjacent end portions of the respective elements in the normal gauging position of said elements; said release portions respectively being radially more remote from the respective opposed face portions of said body than are said respective support portions and being respectively so formed as to permit the respective elements to be moved radially by said retracting means into retracted non-gauging position when said respective release portions are moved into registry with said respective elements; and said respective intermediate cam portions engaging the adjacent opposed end portions of the respective elements and serving to force the latter radially in their respective slots when said manually operative means is moved in the proper direction to move the respective supporting portions into contact with the respective elements when the latter have been forced radially to their respective extreme extended gauging position by said intermediate cam portions.

3. A gauge comprising a body formed with a radial slot; a gauging element mounted for radial movement in said slot; rotary means disposed concentrically with said body and provided with a supporting portion, a release portion, and an intermediate cam portion; and means acting upon said gauging element to move it radially of said slot toward said release portion when the latter is in radial registry with said element; said supporting portion being concentric with the axis of said body and disposed closely adjacent to the opposed face portion thereof and engaging the adjacent end portion of said element when moved into radial registry therewith to support and lock said element in normal gauging position; said release portion being radially more remote from the opposed face portion of said body than is said support portion and when moved into radial registry with said element permitting the latter to be moved radially in its slot in the direction of said release portion to retracted non-gauging position; and said intermediate cam portion being eccentric to the axis of said body and connecting said supporting and release portions and engaging the opposed end portion of said element to force the latter radially in said slot when said rotary means is partially rotated in the proper direction and sufficiently to move said supporting portion into contact with said element when the latter has been forced radially to its extreme extended operative gauging position by said intermediate cam portion.

4. A gauge comprising a body formed with a plurality of radial slots; a plurality of gauging elements respectively slidably mounted for radial movement in said respective slots; rotary means disposed concentrically with said body and provided with a plurality of supporting portions corresponding in number to the number of said elements, a corresponding number of release portions, and a corresponding number of intermediate cam portions; and means acting upon said elements to move them radially in their respective slots toward said release portions respectively when the latter are in registry with their respective said elements; said supporting portions being concentric with the axis of said body and disposed closely adjacent to the opposed face thereof and respectively engaging the adjacent end portions of said respective elements when respectively moved into registry therewith to support and lock said elements in normal gauging position; said release portions respectively being more remote from the opposed face of said body than are said respective support portions and when moved into registry with their respective said elements permitting the latter to be moved radially in their respective slots toward their respective said release portions to retracted non-gauging position; and said respective intermediate cam portions being eccentric to the axis of said body and respectively connecting adjacent supporting and release portions and respectively engaging the respective opposed end portions of said elements to force the latter radially in their respective slots when said rotary means is partially rotated in the proper direction and sufficiently to move the said respective supporting portions into contact with said respective elements when the latter have been forced radially to their respective extreme extended operative gauging positions by said respective intermediate cam portions.

5. A gauge comprising a body formed with a plurality of radial slots; a plurality of gauging elements respectively slidably mounted for radial movement in said respective slots; rotary means disposed concentrically in said body and provided with a plurality of supporting portions corresponding in number to the number of said gauging elements, a corresponding number of release portions, and a corresponding number of intermediate cam portions; and means acting upon said elements to move them radially in their respective slots toward said release portions respectively when the latter are in registry with their respective said elements; said supporting portions being concentric with the axis of said body and disposed closely adjacent to the opposed face thereof and respectively engaging the adjacent end portions of said respective said elements when respectively moved into registry therewith to support and lock said elements in normal gauging position; said release portions respectively being radially more remote from the opposed face of said body than are said respective support portions and when moved into registry with their respective said elements permitting the latter to be moved radially in their respective slots toward their respective release portions to retracted non-gauging position; and said respective intermediate cam portions being eccentric to the axis of said body and respectively connecting adjacent supporting and release portions and respectively engaging the respective opposed end portions of said elements to force the latter radially to their extreme extended gauging position when said rotary means is partially rotated in the proper direction.

6. A gauge comprising a body formed with a plurality of radial slots, a plurality of gauging elements respectively slidably mounted for radial movement in said respective slots; rotary means disposed concentrically with said body and having an annular groove in a plane perpendicular to the axis of said body and being formed with a plurality of supporting portions corresponding in number to the number of said gauging elements, a corresponding number of release portions, and a corresponding number of intermediate cam portions; and endless band type resilient means disposed in said groove and acting upon said elements to move them radially in their respective slots toward said release portions respectively when the latter are moved into registry with said respective elements; said supporting portions being concentric with the axis of said rotary means and disposed closely adjacent to the opposed face of said body and respectively engaging the adjacent end portions of said respective elements when respectively moved into registry therewith to support and lock said elements in normal gauging position; said release portions respectively being radially more remote from the opposed face of said body than are said respective support portions and when moved into registry with their respective said elements permitting the latter to move under the influence of said resilient means toward their respective release portions to retracted non-gauging position; and said respective intermediate cam portions being eccentric to the axis of said rotary means and respectively engaging said elements and forcing the same radially in said slots to their extreme extended gauging position when said rotary means is partially rotated in the proper direction.

7. A gauge comprising a body formed with a plurality of radial slots; a plurality of gauging elements respectively disposed in said slots; rotary means disposed concentrically in said body and having an annular groove in a plane perpendicular to the axis of said means and being formed with a plurality of supporting portions, a plurality of release portions, and a plurality of intermediate cam portions; and an endless band type resilient means disposed in said groove and acting upon said elements to move them radially toward said rotary means; said supporting portions being concentric with the axis of said rotary means and disposed closely adjacent the opposed face of said body and respectively engaging the respective elements when moved into registry therewith to support and lock said elements in normal gauging position; said release portions respectively being radially more remote from the opposed face of said body than are said respective support portions and when moved into registry with their respective said elements permitting said resilient means to move said elements toward said rotary means to retracted non-gauging position; and said respective intermediate cam portions being eccentric to the axis of said rotary means and respectively engaging said elements and forcing the same radially outwardly in said slots to their extreme extended gauging position when said rotary means is partially rotated in the proper direction.

8. A gauge comprising a body formed with a plurality of radial slots; a plurality of gauging elements respectively slidably mounted for radial movement in said respective slots; rotary ring-form means surrounding said body and provided with a plurality of supporting portions, a plurality of release portions, and a plurality of intermediate cam portions; and retracting means acting upon said elements to move them toward their respective release portions when said elements and said release portions respectively are in registry; said supporting portions being concentric with the axis of said rotary means and disposed closely adjacent the opposed face of said body and respectively engaging the respective elements when moved into registry therewith to support and lock said elements in normal gauging position; said release portions respectively being radially more remote from the opposed face of said body than are said respective support portions and when moved into registry with their respective said elements permitting said retracting means to move said elements toward said rotary means to retracted non-gauging position; and said respective cam portions respectively engaging said elements and forcing the same radially in said slots to their respective extreme extended gauging position when said rotary means is partially rotated in the proper direction.

9. A gauge comprising a body formed with a plurality of radial slots; a plurality of gauging elements respectively slidably disposed in said slots; rotary ring-form means surrounding said body and provided with a plurality of supporting portions, a plurality of release portions, and a plurality of cam portions; and individual leaf springs respectively bearing upon said body and acting respectively upon said respective elements to move them toward said release portions respectively when the respective elements and the respective release portions are in registry; said supporting portions being concentric with the axis of said rotary means and respectively engaging the respective elements when moved into registry therewith to support and lock said elements in normal gauging position; said release portions being of such size and form as to permit said elements respectively when in registry with said release portions to be moved radially by their respective retracting leaf springs toward said release portions to retracted non-gauging position; and said cam portions respectively engaging said elements and forcing the same radially in said slots to their respective extreme extended gauging position when said rotary means is partially rotated in the proper direction.

10. A gauge comprising a body formed with a radial slot; a gauging element slidably mounted in said slot; operative means movable axially of said body and provided with a supporting portion, a release portion, and an intermediate cam portions; and means acting upon said element to move it in said slot radially of said body toward said release portion when the latter is in registry with said element; said supporting portion extending parallel to the axis of said body and being concentric with said axis and disposed closely adjacent to the opposed face of said body and engaging the adjacent end portion of said element when moved into registry therewith to support and lock said element in normal gauging position; said release portion being radially more remote from the opposed face of said body than is said support portion and when moved into registry with said element permitting the latter to be moved in said slot radially of said body in the direction of said release portion to retracted non-gauging position; and said intermediate cam portion being inclined to the axis of said body and, when said operative means is moved in the proper direction, engaging said element and forcing the latter radially of said body in said slot to its extreme extended operative gauging position.

HELGE HELLBERG.
HAROLD JAMES HAYCOCK.
CYRIL LOOSE HELLBERG.